United States Patent [19]

Sharples

[11] Patent Number: 4,930,398

[45] Date of Patent: Jun. 5, 1990

[54] ALTERNATING DOOR HINGE LINES

[75] Inventor: G. F. Sharples, Mercer Island, Wash.

[73] Assignee: The Boeing Company, Seattle, Wash.

[21] Appl. No.: 200,759

[22] Filed: May 31, 1988

[51] Int. Cl.$^5$ .................. E05D 15/50; F41F 5/02; B64D 1/06

[52] U.S. Cl. .................... 89/1.51; 49/193; 49/371; 244/129.5; 244/137.4

[58] Field of Search ............ 89/1.51, 1.54, 1.55; 244/137.4, 129.4, 129.5; 49/192, 193, 340, 371

[56]  References Cited

U.S. PATENT DOCUMENTS

| | | | |
|---|---|---|---|
| 698,989 | 4/1902 | Moffitt | 49/193 |
| 1,133,659 | 3/1915 | Page | 292/51 |
| 1,774,199 | 8/1930 | Good | 49/193 |
| 1,941,454 | 1/1934 | Ainsworth | 49/340 |
| 2,357,397 | 9/1944 | Fuller | 49/193 |
| 2,362,345 | 11/1944 | Bertran | 89/1.54 |
| 2,412,729 | 12/1946 | Hall | 89/1.51 |
| 3,174,712 | 3/1965 | Ricard | 89/1.51 |
| 3,269,061 | 8/1966 | Massina | 49/340 |
| 3,486,272 | 12/1969 | Eigenmann et al. | 49/192 |
| 3,494,247 | 2/1970 | Dilworth, III et al. | 244/137.4 |
| 3,861,083 | 1/1975 | Goiot | 49/193 |
| 4,429,491 | 2/1984 | Bruns | 49/340 |
| 4,502,245 | 3/1985 | Krieger et al. | 49/193 |
| 4,658,545 | 4/1987 | Ingham et al. | 49/340 |
| 4,697,764 | 10/1987 | Hardy et al. | 89/1.51 |

Primary Examiner—David H. Brown
Attorney, Agent, or Firm—Seed and Berry

[57] ABSTRACT

Apparatus is disclosed for mounting a plurality of doors to the weapons bay of an aircraft such that each door is pivotal about one of two hinge lines. Generally, the apparatus includes a door-operating assembly for displacing each of said plurality of doors. A journal assembly is provided for supporting each said door such that the door is pivotal about either a first or second axis. The journal assembly includes a housing portion which is fixed to an end wall of the weapons bay and a bearing portion which is fixed to the door. The operating mechanism is responsive to an input signal for selectively displacing the door such that the door pivots about either the first or second axis.

14 Claims, 3 Drawing Sheets

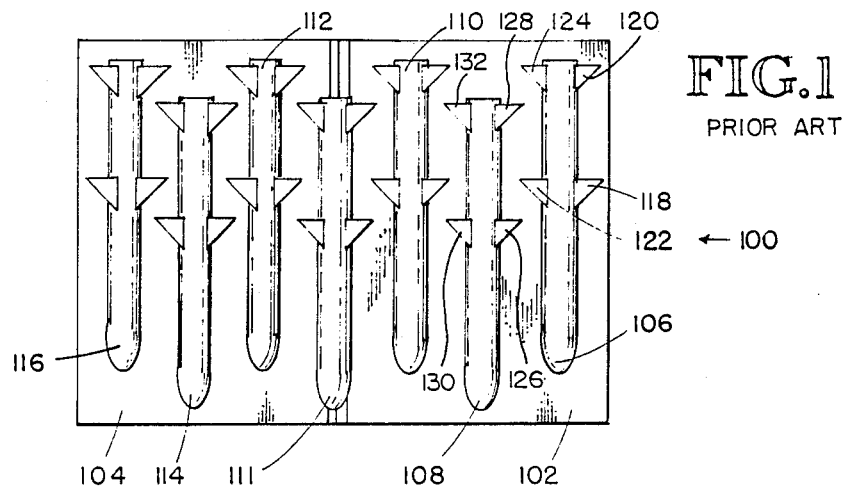
FIG.1 PRIOR ART
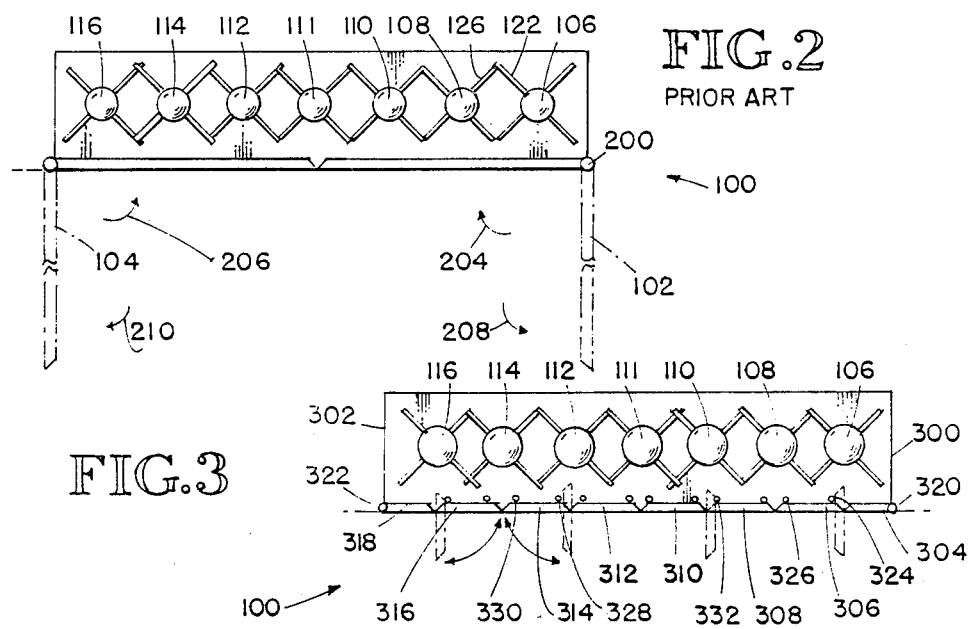
FIG.2 PRIOR ART
FIG.3
FIG.4

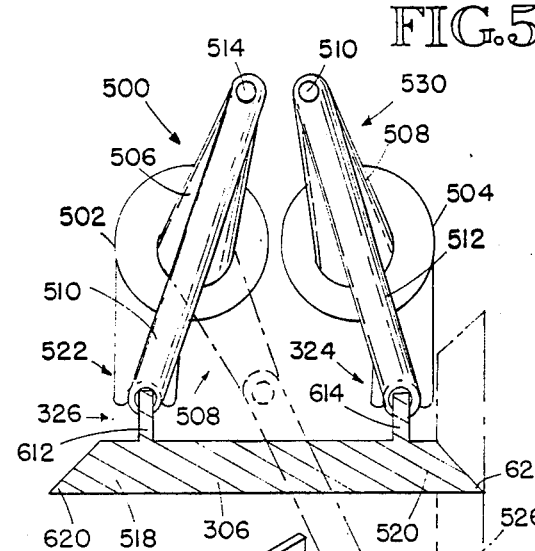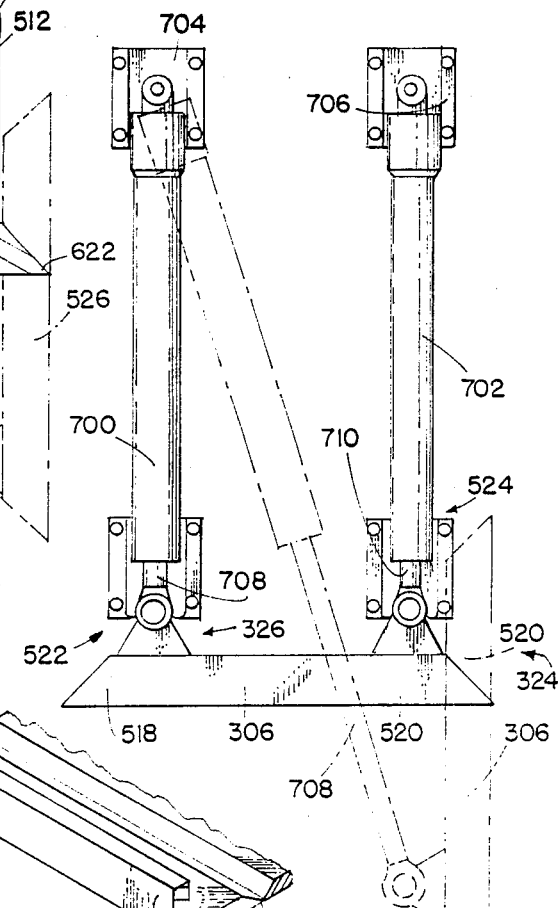

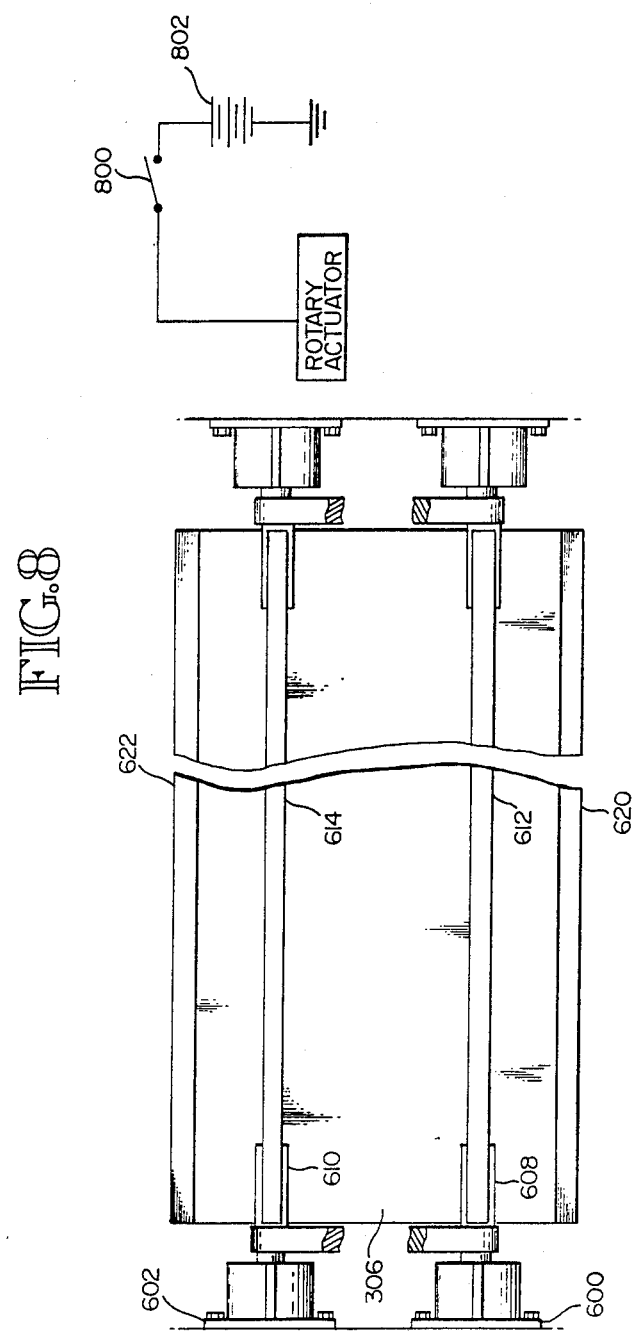

ALTERNATING DOOR HINGE LINES

STATEMENT OF GOVERNMENT INTEREST

The Government has certain rights in this invention.

TECHNICAL FIELD

The present invention is directed toward apparatus for releasing objects from the weapons bay of an aircraft, and more particularly, toward apparatus for hinging a plurality of weapons bay doors such that they may pivot about alternating hinge lines.

BACKGROUND ART

Prior art methods for releasing weapons from the weapons bay of an aircraft generally provide two hinged doors for releasing the weapons stored on the interior side thereof. While these doors are effective for releasing substantially all, or half, of the weapons simultaneously, they provide no means of selectively releasing one or two weapons at a time. Further, these doors provide the disadvantage of increasing drag upon the aircraft and reducing the stability of the aircraft when the doors are open.

Other prior art methods have proposed a plurality of smaller doors across the weapons bay to allow more selective release of objects. These methods, however, suffer from the disadvantage that the door must be constructed with less than adequate load-bearing capacity. Further, these methods require additional structure intermediate the pairs of doors to support the doors at the hinge line about which they pivot. The additional structure reduces the space available in the weapons bay, thus reducing the number of weapons which can be carried.

Accordingly, there is a desire to provide apparatus for selectively releasing weapons from the weapons bay of an aircraft. Also, there is a desire to provide weapons bay doors which minimize the amount of drag placed on the aircraft when opened. Further, there is a desire to provide weapons bay doors which do not impair the stability of the aircraft when opened.

SUMMARY OF THE INVENTION

The present invention provides apparatus for releasing objects from the weapons bay of an aircraft wherein the weapons bay is defined by two side walls and two end walls. The apparatus includes an elongate door and a journal assembly for supporting the door such that the door is pivotal about first and second axes. The journal assembly includes a housing portion which is fixed to an end wall of the weapons bay. The journal assembly further includes a bearing portion which is fixed to the door and matably engageable with the housing portion. An actuator assembly is provided for selectively displacing the door such that the door pivots about the first or second axis.

In a first embodiment of the invention, the actuator assembly comprises first and second rotary actuators which are secured to an end wall of the weapons bay for displacing the door. The rotary actuators each include respective first and second actuator axles and are responsive to input signals for rotating their respective actuator axles. The actuator assembly further includes first and second linkage mechanisms associated with the first and second actuator axles, respectively, for displacing the door in response to the rotation of the actuator axles such that the door pivots about the first or second axis in response to rotation of the first or second actuator axle.

In an alternative embodiment of the invention, the actuator assembly includes linear actuators secured to the end wall of the weapons bay. The linear actuators include actuator arms and are responsive to input signals to linearly displace the actuator arms. The linear actuators are coupled to linkage mechanisms which respond to the linear displacement of the actuator arms to displace the door such that the door pivots about the first or second axis.

BRIEF DESCRIPTION OF THE DRAWINGS

FIG. 1 is an illustrative plan diagram of a plurality of weapons mounted in a weapons bay as in the prior art.

FIG. 2 is a front view of the prior art weapons bay illustrated in FIG. 1.

FIG. 3 is a front view of a weapons bay having the novel doors which are the subject of the present invention.

FIG. 4 is a front view of the weapons bay including the novel weapons bay doors which are the subject of the present invention, illustrating the doors in an alternative "open" configuration.

FIG. 5 is a partial sectional view of novel apparatus for pivoting the weapons bay door about alternating hinge lines.

FIG. 6 is a partial sectional view illustrating apparatus for supporting the weapons bay doors.

FIG. 7 is a partial sectional view of an alternative embodiment of the invention using linear actuators.

FIG. 8 is a more detailed illustration of a bay door constructed in accordance with the present invention.

DETAILED DESCRIPTION OF THE DRAWINGS

FIGS. 1 and 2 provide illustrative drawings of weapons bay doors which are constructed in accordance with the prior art. A weapons bay 100 includes two doors 102 and 104 which are mounted to the side walls (not shown) of the weapons bay 100 using conventional means (not shown). The weapons bay is loaded with seven weapons which are to be released therefrom, wherein the seven weapons comprise missiles 106–116. It will be apparent to those skilled in the art that although seven missiles are illustrated in FIG. 1, more or less missiles may be provided, as desired. Further, although the invention is described herein by reference to release of missiles 106–116 from the weapons bay 100, the invention has applicability to the release of a plurality of weapons, or other objects, from aircraft.

Each of the plurality of missiles 106–116 includes a plurality of fins. As an example, missile 106 includes fins 118–124, which are visible in the plan view of FIG. 1. Similarly, missile 108 includes fins 126–132, which are visible in the view of FIG. 1. It will be apparent, however, that missiles 106 and 108 each include four counterpart fins (see, e.g., FIG. 2) which are not visible in the plan view of FIG. 1.

In an effort to maximize the number of weapons which can be carried in the weapons bay 100, it is desirable to overlap the fins of the missiles and stagger adjacent missiles, as shown in FIG. 1. Accordingly, missile 106 is horizontally displaced relative to missile 108 such that the fins 122 and 124 do not abut the fins 126 and 128. With reference to FIG. 2, the front view of the weapons bay further illustrates the overlapping of the fins 122 and 126.

It is apparent, using this method of loading missiles, that the number of finned weapons which may be placed in the weapons bay is greater than the number which would be placed without the horizontal staggering of the missiles. However, this overlapping of fins substantially precludes any hinge points which are not located on the end or side walls of the weapons bay, thereby precluding application of the prior art methods which use a plurality of smaller doors (discussed above) to the weapons bay 100 of FIGS. 1 and 2.

The doors 102 and 104 are pivotally mounted to the weapons bay by two hinge points 200 and 202. Each door 102 and 104 is shown in a first closed position (see arrows 204 and 206, respectively) wherein the missiles 106-116 are enclosed within the weapons bay by the doors 102 and 104, and in an open position (see arrows 208 and 210, respectively), wherein the missiles 106-116 can be released. It will be apparent to those skilled in the art that by pivoting only the door 102 from its closed position to its open position, while maintaining the door 104 closed, the missiles 106-110 can be released from the weapons bay. By pivoting the door 104 from the closed position to the open position, while maintaining the door 102 closed, the missiles 112-116 can be released. The missile 111 can only be released by pivoting both doors 102 and 104. Obviously, by opening both doors simultaneously, all of the missiles 106-116 can be released. Hence, the above-described prior art fails to provide apparatus for selectively releasing one or more weapons from the weapons bay.

With reference to FIGS. 3 and 4, there is provided a partial sectional view of the weapons bay 100 including the novel weapons bay doors which are the subject of the present invention. The weapons bay 100 includes two side walls 300 and 302 which define the width of the weapons bay. Further, the weapons bay 100 includes two end walls 604 and 606 (FIG. 8), including a fore end wall 604 and an aft end wall 606 which define the length of the weapons bay. As illustrated, the weapons bay 100 is loaded with missiles 106-116 positioned such that adjacent missiles are staggered to allow the fins to overlap, as discussed above with reference to the prior art.

In accordance with the subject invention, the weapons bay 100 is provided with a plurality of weapons bay doors 304-318. Two end doors 304 and 318, which are adjacent the side walls 300 and 302, respectively, of the weapons bay 100, are mounted to the weapons bay 100 using conventional means (not shown) such that they are pivotal about hinge lines 320 and 322. The remaining six interior doors 306-316 are mounted to the weapons bay using novel door-operating apparatus which control operation of the interior doors 306-316 such that they may be pivoted about alternating hinge lines.

As an example, interior door 306 is mounted to the weapons bay 100 in a manner such that it is pivotal about either hinge line 324 or 326. Similarly, interior door 314 is mounted to the weapons bay in a manner such that it is pivotal about either hinge line 328 or 330. It will become apparent from an inspection of FIGS. 3 and 4 that each interior door 306-316 is mounted to the weapons bay 100 in a manner such that it is pivotal about two alternate hinge lines. In this manner, the interior doors may be opened in a manner to allow selective access to the missiles 106-116. The manner in which the door-operating apparatus pivots the interior doors 306-316 about the alternating hinge lines will be described in more detail below by reference to FIGS. 5, 6 and 7.

As an illustrative example of selective missile release, the door 306 may be pivoted about hinge line 324 while door 308 is pivoted about hinge line 332 such that the missile 108 may be released from the weapons bay 100. Alternatively, door 304 may be pivoted about hinge line 320 while door 306 is pivoted about hinge line 326 to allow release of the missile 106, as shown in FIG. 4. It will be apparent to those skilled in the art that by selectively pivoting the interior doors 306-316 about their alternating hinge lines, each of the missiles 106-116 may be selectively released from the weapons bay 100.

With further reference to FIG. 4, the door 314 is illustrated in the closed position (see arrow 400) and is also shown in phantom pivoted about the hinge line 330 (see arrow 402). The phantom illustration shows that a portion of the door 314 pivots interior of the weapons bay 100 when opened. This is true for each of the interior doors 306-316, regardless of which hinge line it is pivoted about. The portion of the interior door 314 which is disposed outside the weapons bay in the opened position is much smaller than the portion of the doors 104 and 102 which was disposed outside of the weapons bay in the prior art. Accordingly, the drag which is placed on the aircraft is smaller. Also, opening the interior doors does not significantly affect the aircraft's stability.

A more detailed illustration of the novel door operating apparatus for pivoting the interior doors 306-316 about alternating hinge lines is provided in FIG. 5. Therein, the door-operating apparatus is illustrated by reference to the interior door 306. It will be appreciated, however, by those skilled in the art that the interior doors 308-316 are each mounted to the weapons bay 100 in the manner as will be described for the door 306.

The door-operating apparatus for mounting the door 306 to the weapons bay comprises an actuator assembly 500. The actuator assembly 500 may be mounted to the end walls of the weapons bay 100 using any suitable conventional means (not shown). For example, the rotary actuators 502 and 504 may be bolted to the end walls of the weapons bay 100. The actuator assembly 500 includes first and second rotary actuators 502 and 504. Each rotary actuator includes an actuator axle 812 and 814 and is responsive to an input signal for rotating the actuator axle. The rotary actuators 502 and 504 may comprise any suitable device for providing rotary output in response to an input signal. As illustrative examples, the rotary actuators 502 and 504 may comprise hydraulic, pneumatic or electric prime movers. Other suitable devices will readily become apparent to those skilled in the art. The input signal can also be provided in any suitable manner. As an example, the input signal may comprise an electrical signal originated by the operator of the aircraft.

As an example, rotary actuators 502 and 504 may be responsive to an electrical input signal from batteries 802 and 804, respectively (FIG. 8), which electrical input signal is selectively provided by switches 800 and 806. The switches 800 and 806 may be operated by the operator of the aircraft, as discussed above.

With further reference to FIG. 8, it will be apparent to those skilled in the art that third and fourth rotary actuators 808 and 810 may be provided at an opposite end of the door 306 and will be responsive to the electrical signals to rotary actuators 502 and 504, respectively, to pivot the door in the same manner as their mirror image actuator.

Each actuator axle is coupled to a respective linkage assembly 528 and 530 for arcuately displacing the door 306 in response to rotation of the actuator axle. The linkage assemblies 528 and 530 comprise respective actuator arms 506 and 508, which are coupled to connecting arms 510 and 512 via pivotal connections 514 and 516, respectively. The actuator arms 506 and 508, the connecting arms 510 and 512, and the pivotal connections 514 and 516 of the linkage assemblies 528 and 530 may comprise any suitable apparatus known in the art. The connecting arms 510 and 512 are pivotally connected to the door 306 by journal assemblies 522 and 524, respectively, as will be described more fully below.

In operation, first and second input signals are supplied to the rotary actuators 502 and 504, respectively. By activating rotary actuator 502, the actuator arm 506 and connecting arm 510 cooperate to arcuately displace an end portion 518 of the door 306 about the hinge line 324 to open the door, as shown by the phantom door 526. The actuator 502 may be reactivated in the reverse direction to arcuately displace the end portion 518 of the door 306 to pivot the door 306 about the hinge line 324 and thereby return the door to the closed position.

In the presently preferred embodiment of the invention, the rotary actuator 502 is adapted to rotate in two directions, such that rotation of the actuator arm 506 in a first direction fully opens the door 306 and rotation of the actuator arm 506 in a second direction, opposite to the first direction, fully closes the door 306. This type of operation requires the input signal to include information relative to the direction of rotation of the actuator axle to determine whether the door is opened or closed. Additionally, apparatus must be provided to stop rotation of the actuator axle, which apparatus may comprise a mechanical stop, as is known in the art, or a signal stop, included in the input signal, or a combination of mechanical and signal stop.

It will be apparent to those skilled in the art that the rotary actuator 502 may be adapted to rotate the actuator arm 506 in only one direction, such that rotation of the actuator arm 506 by a first predetermined angular displacement fully opens the door 306 and rotation of the actuator arm by a second predetermined angular displacement (in the same direction) fully closes the door 306. This type of operation will require an input signal which includes information relative to the first and second predetermined angular displacements to ensure that the door is fully opened and fully closed.

The rotary actuator 504 operates in a manner similar to the rotary actuator 502. Accordingly, the rotary actuator 504 is activated, in response to an input signal, such that the actuator arm 508 and the connecting arm 512 cooperate to arcuately displace an end portion 520 of the door 306 to pivot the door 306 about the hinge line 326.

The journaling assemblies 522 and 524 are illustrated more fully in FIG. 6. Each journal assembly 522 and 524 comprises a housing portion 600 and 602, respectively, which includes a bearing-receiving chamber 616 and 618. The housing portion may comprise a journal box, a pillow block, or any other suitable apparatus known in the art. The journal boxes 600 and 602 are fixedly mounted to the end walls of the weapons bay 100 using any suitable conventional means. As illustrated in FIG. 6, the journal boxes 600 and 602 are constructed to be bolted to the end walls of the weapons bay 100.

Each journal assembly 522 and 524 further includes a cylindrically shaped bearing 604 and 606, respectively. The bearings 604 and 606 are mounted to the door 306 via shafts 608 and 610. The connecting arms 510 and 512 are pivotally coupled to the shafts 608 and 610, respectively, intermediate the bearings 604 and 606 and the door 306.

When the door 306 is closed, the bearings 604 and 606 matably engage the bearing-receiving chambers 616 and 618 of the journal boxes 600 and 602 and cooperate therewith to provide lateral support to the door 306. When the door is open, e.g., by displacing the end portion 518 of the door 306 about the hinge line 324, the bearing 606 remains housed within the bearing-receiving chamber 618 of the journal box 602 while the bearing 604 is withdrawn from the bearing-receiving chamber 616 and displaced from the journal box 600. The journal box 602 and the bearing 606 continue to cooperate to provide lateral support to the door 306.

A particularly advantageous feature of the present invention is that the apparatus for mounting the doors to the weapons bay 100 allows the doors to include apparatus for reinforcing the load-bearing capacity of the door. With reference to FIG. 6, the door 306 includes first and second reinforcing rails 612 and 614 which are fixedly mounted to the door 306. The rails 612 and 614 are positioned in substantially parallel, opposing relation and extend along the length of the door 306 on the interior of the weapons bay 100. The reinforcing rails 612 and 614 are constructed to extend the entire length of the door 306. The shafts 608 and 610 may be mounted to the reinforcing rails 612 and 614, using any suitable means. As illustrated in FIG. 6, the shafts 608 and 610 are bolted to the reinforcing rails 612 and 614.

In the presently preferred embodiment of the invention, the hinge lines 324 and 326 are slightly displaced from the door 306 in the interior direction of the weapons bay 100. Further, the hinge lines 324 and 326 are displaced inwardly from the edges 620 and 622 of the door 306. The displacement of the hinge lines results in a portion of the door 306 being positioned interior of the weapons bay 100 when the door is opened, as discussed above.

With reference to FIG. 7, an alternative embodiment of the invention is provided. Therein, the door-operating apparatus mechanism comprises first and second linear actuators 700 and 702. The linear actuators are fixed to the end walls of the weapons bay using any suitable means. As illustrated in FIG. 7, the linear actuators 700 and 702 are bolted to the end walls of the weapons bay via respective mounting blocks 704 and 706. The linear actuators are coupled to the door 306 via journal assemblies, such as the journal assemblies 522 and 524, discussed above. Each linear actuator includes an actuator arm 708 and 710 and is responsive to an input signal for linearly displacing the actuator arms. As illustrated in phantom in FIG. 7, linear displacement of the actuator arm 708 results in displacement of the end portion 518 of the door 306 such that the door 306 pivots about the hinge line 324. In similar fashion, displacement of the actuator arm 710 results in displacement of the end portion 520 of the door 306 such that the door 306 pivots about the hinge line 326. As with the embodiment of FIG. 5, it is desirable to provide four linear actuators for mounting each door to the weapons bay, with two linear actuators to support each end of the door.

It will be apparent to those skilled in the art that since the door-operating apparatus which mounts the interior weapons bay doors 306-316 to the weapons bay 100 is located at the fore and aft ends of the weapons bay, the door and supporting structure which are located in the main cargo space of the weapons bay may be eliminated, thereby maximizing the space available for storage of weapons.

Although the invention has been illustrated and described herein by reference to several presently preferred embodiments thereof, it will be apparent to those skilled in the art that many modifications and variations of the present invention may be made without departing from the true scope and spirit of the invention. Accordingly, the invention should not be limited to the several embodiments shown and described above, but should only be limited by the appended claims which follow.

I claim:

1. Apparatus for allowing the release of projectiles from the weapons bay of an aircraft, the weapons bay having two side walls which cooperate with two end walls to define the bay, said apparatus comprising:
   an elongate weapons bay door having a first exposed side and a second interior side, said door including first and second elongate reinforcing rails fixedly attached to the interior side thereof in substantially parallel, opposing relation and extending outward from the interior side of said door, first and second shafts fixed to the ends of said first rail at a position which is displaced from said door, and third and fourth shafts fixed to the ends of said second rail at a position which is displaced from said door, first, second, third and fourth cylindrically-shaped bearings mounted to respective ones of said first, second, third and fourth shafts;
   journal box means secured to the end walls of the weapons bay for receiving said first, second, third and fourth bearings;
   a first rotary actuator secured to an end wall of the weapons bay, said first rotary actuator including a first actuator axle and being responsive to first and second input signals to provide first and second angular rotation to said first actuator axle, respectively, a first actuator arm having a first end fixed to said first actuator axle such that said first actuator arm rotates in response to rotation of said first actuator axle and a second end pivotally coupled to a first end of a first connectimg arm, said first connecting arm having a second end pivotally coupled to said first shaft intermediate said first bearing and said first rail; and
   a second rotary actuator secured to an end wall of the weapons bay, said second rotary actuator including a second actuator axle and being responsive to third and fourth input signals to provide said first and second angular rotation to said second actuator axle, respectively, a second actuator arm having a first end fixed to said second actuator axle such that said second actuator arm rotates in response to rotation of said second actuator axle and having a second end pivotally coupled to a first end of a second connecting arm, said second connecting arm having a second end pivotally coupled to said third shaft intermediate said third bearing and said second rail.

2. Apparatus as recited in claim 1, further comprising:
   a third rotary actuator secured to an end wall of the weapons bay, said third rotary actuator including a third actuator axle and being responsive to said first and second input signals to provide said second and first angular rotations to said third actuator axle, respectively, a third actuator arm having a first end fixed to said third actuator axle such that said third actuator arm rotates in response to rotation of said third actuator axle and a second end pivotally coupled to a first end of a third connecting arm, said third connecting arm having a second end pivotally coupled to said second shaft intermediate said second bearing and said first rail; and
   a fourth rotary actuator secured to an end wall of the weapons bay, said fourth rotary actuator including a fourth actuator axle and being responsive to said third and fourth input signals to provide said second and first angular rotation to said fourth actuator axle, respectively, a fourth actuator arm having a first end fixed to said fourth actuator axle such that said fourth actuator arm rotates in response to rotation of said fourth actuator axle and having a second end pivotally coupled to a first end of a fourth connecting arm, said fourth connecting arm having a second end pivotally coupled to said fourth shaft intermediate said fourth bearing and said second rail.

3. Apparatus for allowing the release of projectiles from the weapons bay of an aircraft, the weapons bay having two side walls which cooperate with two end walls to define the bay, said apparatus comprising:
   an elongate weapons bay door having a first exposed side and a second interior side, said door including first and second elongate reinforcing rails fixedly attached to the interior side thereof in substantially parallel, opposing relation and extending outward from the interior side of said door, first and second shafts fixed to the ends of said first rail at a position which is displaced from said door and third and fourth shafts fixed to the ends of said second rail at a position which is displaced from said door, first, second, third and fourth cylindrically shaped bearings mounted to respective ones of said first, second, third and fourth shafts;
   journal box means secured to the end walls of the weapons bay for receiving said first, second, third and fourth bearings;
   a first linear actuator secured to an end wall of the weapons bay, said first linear actuator including a first actuator piston and being responsive to first and second input signals to respectively protract and retract said first actuator piston, said first actuator piston having a first end pivotally coupled to said first shaft intermediate said first bearing and said first rail; and
   a second linear actuator secured to an end wall of the weapons bay, said second linear actuator including a second actuator piston and being responsive to third and fourth input signals to respectively protract and retract said second actuator piston, said second actuator piston having a first end pivotally coupled to said third shaft intermediate said third bearing and said second rail.

4. Apparatus as recited in claim 3, further comprising:
   a third linear actuator secured to an end wall of the weapons bay, said third linear actuator including a third actuator piston and being responsive to said first and second input signals to respectively protract and retract said third actuator piston, said third actuator piston having a first end pivotally coupled to said second shaft intermediate said second bearing and said first rail; and a fourth linear actuator secured to an end wall of the weapons bay, said fourth linear actuator including a fourth actuator piston and being responsive to said third and fourth input signals to respectively protract and retract said fourth piston, said fourth actuator piston having a first end pivotally coupled to said fourth shaft intermediate said fourth bearing and said second rail.

5. Apparatus for allowing the release of projectiles from the weapons bay of an aircraft, the weapons bay having two side walls and two end walls which define the weapons bay, said apparatus comprising:

an elongate weapons bay door;
reinforcing means for reinforcing said door to increase its load-bearing capacity;
shaft means for mounting first, second, third and fourth bearings to said door;
journal box means secured to the end walls of the weapons bay for receiving said first, second, third and fourth bearings; and
actuator means coupled to said shaft means for arcuately displacing said door in response to first and second input signals such that said door pivots in two angular directions about said third and fourth bearings, said actuator means being further coupled to said second rail for arcuately displacing said door in response to third and fourth input signals such that said door pivots in two angular directions about said first and second bearings.

6. Apparatus as recited in claim 5 wherein said door includes an interior side and an exterior side and wherein said reinforcing means comprises first and second elongate reinforcing rails fixedly attached to the interior side of said door in substantially parallel relation and extending outward from the interior side of said door.

7. Apparatus as recited in claim 6 wherein said shaft means comprises first and second shafts fixed to the ends of said first rail and third and fourth shafts fixed to the ends of said second rail.

8. Apparatus as recited in claim 5 wherein said actuator means comprises:

a first rotary actuator secured to an end wall of the weapons bay, said first rotary actuator including a first actuator axle and being responsive to said first and second input signals to provide first and second angular rotation to said first actuator axle, respectively, a first actuator arm having a first end fixed to said first actuator axle such that said first actuator arm rotates in response to rotation of said first actuator axle and a second end pivotally coupled to a first end of a first connecting arm, said first connecting arm having a second end pivotally coupled to said shaft means; and a second rotary actuator secured to an end wall of the weapons bay, said second rotary actuator including a second actuator axle and being responsive to third and fourth input signals to provide said first and second angular rotation to said second actuator axle, respectively, a second actuator arm having a first end fixed to said second actuator axle such that said second actuator arm rotates in response to rotation of said second actuator axle and having a second end pivotally coupled to a first end of a second connecting arm, said second connecting arm having a second end pivotally coupled to said shaft means.

9. Apparatus as recited in claim 8 wherein said actuator means further comprises:

a third rotary actuator secured to an end wall of the weapons bay, said third rotary actuator including a third actuator axle and being responsive to said first and second input signals to provide said second and first angular rotations to said third actuator axle, respectively, a third actuator arm having a first end fixed to said third actuator axle such that said third actuator arm rotates in response to rotation of said third actuator axle and a second end pivotally coupled to a first end of a third connecting arm, said third connecting arm having a second end pivotally coupled to said shaft means; and a fourth rotary actuator secured to an end wall of the weapons bay, said fourth rotary actuator including a fourth actuator axle and being responsive to said third and fourth input signals to provide said second and first angular rotation to said fourth actuator axle, respectively, a fourth actuator arm having a first end fixed to said fourth actuator axle such that said fourth actuator arm rotates in response to rotation of said fourth actuator axle and having a second end pivotally coupled to a first end of a fourth connecting arm, said fourth connecting arm having a second end pivotally coupled to said shaft means.

10. Apparatus as recited in claim 5 wherein said actuator means comprises:

a first linear actuator secured to an end wall of the weapons bay, said first linear actuator including a first actuator piston and being responsive to said first and second input signals to respectively protract and retract said first actuator piston, said first actuator piston having a first end pivotally coupled to said shaft means; and a second linear actuator secured to an end wall of the weapons bay, said second linear actuator including a second actuator piston and being responsive to third and fourth input signals to respectively protract and retract said second actuator piston, said second actuator piston having a first end pivotally coupled to said shaft means.

11. Apparatus as recited in claim 10 wherein said actuator means further comprises:

a third linear actuator secured to an end wall of the weapons bay, said third linear actuator including a third actuator arm and being responsive to said first and second input signals to respectively protract and retract said third actuator arm, said third actuator arm having a first end pivotally coupled to said shaft means; and a fourth linear actuator secured to an end wall of the weapons bay, said fourth linear actuator including a fourth actuator arm and being responsive to said third and fourth input signals to respectively protract and retract said fourth actuator arm, said fourth actuator arm having a first end pivotally coupled to said shaft means.

12. Apparatus for allowing the release of objects from the weapons bay of an aircraft wherein the weapons bay is defined by two side walls intermediate fore and aft end walls, said apparatus comprising:

a plurality of elongate doors, said plurality of elongate doors including first and second end doors and a plurality of interior doors;

means for pivotally mounting said first and second end doors to the side walls of the weapons bay;

journal means for supporting said plurality of interior doors such that each said interior door is pivotal about a first and second axis, said journal means including a plurality of journal housings fixed to the end walls of the weapons bay and a plurality of journal bearings fixed to said plurality of interior doors, said plurality of journal bearings being matably engageable with said plurality of said journal housings; and actuator means for selectively displacing said plurality of interior doors such that each said interior door is pivotal about its first and second axes.

13. Apparatus as recited in claim 12 wherein said actuator means comprises:

a plurality of first and second door-operating assemblies, each said first and second door-operating assembly being associated with one of said plurality of interior doors, each said first door-operating assembly being fixedly mounted to the fore end wall of the weapons bay and each said second door-operating assembly being fixedly mounted to the aft end wall of the weapons bay; and a plurality of first and second linkage means each associated with respective ones of said first and second door-operating assemblies for displacing said plurality of interior doors in response to said door-operating assembly such that each said interior door is pivotal about the first and second axis.

14. Apparatus as recited in claim 13 wherein each said door-operating assembly comprises:

a rotary actuator including a first actuator axle and being responsive to first and second input signals to provide first and second angular rotation to said actuator axle, an actuator arm having a first end fixed to said actuator axle such that said actuator arm rotates in response to rotation of said actuator axle and a second end pivotally coupled to a first end of a connecting arm, said connecting arm having a second end pivotally coupled to one of said plurality of interior doors.

* * * * *